US010769025B2

(12) United States Patent
Gupta et al.

(10) Patent No.: US 10,769,025 B2
(45) Date of Patent: Sep. 8, 2020

(54) INDEXING A RELATIONSHIP STRUCTURE OF A FILESYSTEM

(71) Applicant: Cohesity, Inc., San Jose, CA (US)

(72) Inventors: Apurv Gupta, Bangalore (IN); Akshat Agarwal, Delhi (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/427,791

(22) Filed: May 31, 2019

(65) Prior Publication Data
US 2020/0233751 A1 Jul. 23, 2020

Related U.S. Application Data

(60) Provisional application No. 62/793,702, filed on Jan. 17, 2019.

(51) Int. Cl.
| | |
|---|---|
| *G06F 17/00* | (2019.01) |
| *G06F 7/00* | (2006.01) |
| *G06F 11/14* | (2006.01) |
| *G06F 16/182* | (2019.01) |
| *G06F 16/11* | (2019.01) |
| *G06F 16/901* | (2019.01) |

(52) U.S. Cl.
CPC ........ *G06F 11/1451* (2013.01); *G06F 16/128* (2019.01); *G06F 16/182* (2019.01); *G06F 16/9027* (2019.01)

(58) Field of Classification Search
CPC .............. G06F 11/1451; G06F 16/182; G06F 16/9027; G06F 16/128
USPC ........................................................ 707/600
See application file for complete search history.

(56) References Cited

U.S. PATENT DOCUMENTS

| | | | | |
|---|---|---|---|---|
| 7,251,749 | B1* | 7/2007 | Fong | G06F 11/1469 714/15 |
| 7,433,898 | B1* | 10/2008 | Georgiev | G06F 11/203 707/999.009 |
| 7,467,167 | B2* | 12/2008 | Patterson | G06F 11/1464 707/999.204 |
| 7,873,601 | B1* | 1/2011 | Kushwah | G06F 11/1451 707/654 |
| 9,336,222 | B2* | 5/2016 | Pn | G06F 16/1727 |
| 2009/0006792 | A1* | 1/2009 | Federwisch | G06F 16/10 711/162 |
| 2010/0179959 | A1* | 7/2010 | Shoens | G06F 16/128 707/758 |
| 2011/0082837 | A1* | 4/2011 | Cherkasova | G06F 11/3419 707/654 |
| 2013/0086121 | A1* | 4/2013 | Preslan | G06F 16/13 707/797 |
| 2013/0110778 | A1* | 5/2013 | Taylor | G06F 11/1435 707/624 |
| 2014/0081979 | A1* | 3/2014 | Pn | G06F 16/1727 707/741 |

(Continued)

*Primary Examiner* — Pavan Mamillapalli
(74) *Attorney, Agent, or Firm* — Van Pelt, Yi & James LLP

(57) ABSTRACT

One or more storage locations of file inodes in a data source to be backed up are identified. Filesystem metadata information is extracted from the one or more identified storage locations. At least one item of the extracted filesystem metadata information includes a reference to a parent inode. The extracted filesystem metadata information is stored in a data structure. The contents of the data structure are analyzed to index a relationship structure of file system contents of the data source.

17 Claims, 5 Drawing Sheets

(56) References Cited

U.S. PATENT DOCUMENTS

| | | | |
|---|---|---|---|
| 2016/0224580 A1* | 8/2016 | Jain | G06F 16/134 |
| 2018/0285198 A1* | 10/2018 | Dantkale | G06F 12/0811 |
| 2019/0146672 A1* | 5/2019 | Ben Dayan | G06F 3/0604 |
| | | | 711/154 |

* cited by examiner

INDEXING A RELATIONSHIP STRUCTURE OF A FILESYSTEM

CROSS REFERENCE TO OTHER APPLICATIONS

This application claims priority to U.S. Provisional Patent Application No. 62/793,702 entitled EFFICIENT FILESYSTEM TREE EXTRACTION FROM DISK IMAGES filed Jan. 17, 2019 which is incorporated herein by reference for all purposes.

BACKGROUND OF THE INVENTION

A system may store a plurality of files and use a filesystem to organize and keep track of the plurality of files. The plurality of files may be organized using a filesystem tree structure. An index of the filesystem tree may be generated. The index of the filesystem tree may be periodically generated to create different versions of the index corresponding to different points in time. The different versions of the index may show the one or more files that were added to the system between the different points in time, the one or more files that were modified between the different points in time, and/or the one or more files that were removed from the system between the different points in time.

BRIEF DESCRIPTION OF THE DRAWINGS

Various embodiments of the invention are disclosed in the following detailed description and the accompanying drawings.

DETAILED DESCRIPTION

Figure 1:
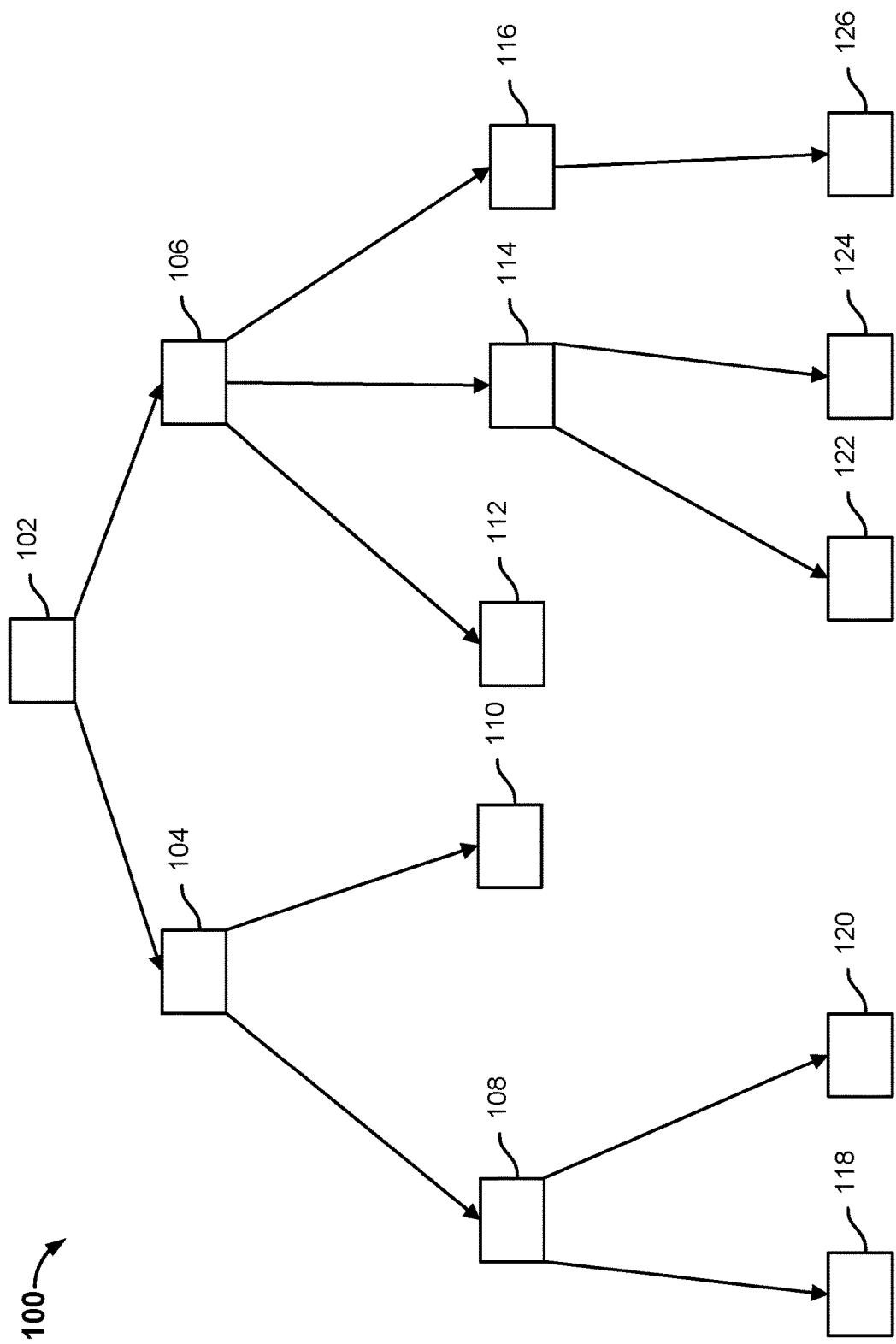
FIG. 1 is a diagram illustrating an example of a filesystem tree.

A system may store a plurality of files and use a file directory tree structure to organize the files. The file directory tree structure may be comprised of a root node, one or more levels of one or more intermediate nodes, and a plurality of leaf nodes. A node of the file directory tree structure may correspond to a directory, a sub-directory, or a file. For example, a root node of the file directory tree structure may correspond to the root directory "C:\," an intermediate node may correspond to the sub-directory "C:\Users," another intermediate node may correspond to the sub-directory "C:\Users\User1," and a leaf node may correspond to a file "test.txt." The file path for "test.txt" may be represented as "C:\Users\User1 \test.txt."

Each node of the file directory tree structure may have a corresponding inode. The filesystem may be represented as a filesystem tree structure comprised of a plurality of inodes. An inode is a data structure that describes a file system object, such as a file, directory, or sub-directory. An inode may store a pointer to another inode. A file system object may be assigned a name and an inode number when the file system object is generated. A filesystem may store a data structure that associates the file system object name with the inode number. When a file with a particular filename is requested, the filename may be used to identify the inode associated with the file. The inodes of the filesystem tree structure may be used to locate the data associated with the file. For example, the inode tree structure may be traversed to the inode associated with the file to locate the data associated with the file. The pointers stored by the inodes may be used to locate the inode associated with the file. The data associated with each inode included in the traversal path may be fetched and read. Each fetch and read step has an associated cost (e.g., spinning up disk, computing resources, time to perform the fetch and read step, etc.).

The filesystem tree structure may be indexed to allow the filesystem of a system to be browsed or searched without loading the disks. The filesystem tree may be indexed by traversing the filesystem tree from the root inode of the filesystem tree to each of the inodes of the filesystem tree. Systems may generate the index by mounting the filesystem and then use a plurality of POSIX (Portable Operating System Interface) calls (e.g., ReadDir) to traverse the entire filesystem tree structure and create the filesystem tree structure based on the traversal. This may take a long time to perform because each step in the traversal may require a disk to spin up to retrieve the data associated with the inode. For example, the system may traverse the filesystem tree structure from the root inode, issue a POSIX call to read the root inode, spin up the disk to obtain the data associated with the root inode, read the data associated with the root inode, determine one or more intermediate inodes based on the read data, and continue the process for the other inodes associated with the filesystem tree structure. A filesystem tree may be comprised of a large number of inodes (e.g., millions, billions, etc.). The amount of time needed to generate the index of the filesystem tree may be directly related to the number of disk reads.

In response to a request for data associated with a particular inode, the system may be configured to retrieve a preset amount of data from the disk. This may be an inefficient manner of retrieving inode data because the preset amount of retrieved data may include not only the data associated with the requested inode, but also other data stored by the system. An indexer may need to parse through the returned data to determine which portions of the returned data correspond to the data associated with the requested inode. Furthermore, returning extraneous data may waste system resources because system resources that are used to return extraneous data could have been used for other data that needs to be retrieved.

An index for the filesystem tree structure may be efficiently generated by leveraging one or more properties associated with particular filesystems. The index may include a plurality of directories and one or more files included in each directory. The order of traversal of the filesystem may not be a consideration because some filesystems may identify the data ranges in the disk file which correspond entirely to the filesystem metadata (i.e., the inodes associated with file system objects). For example, a system that uses New Technology File System (NTFS) may store the filesystem metadata in a separate Master File Table (MFT) file. A system that uses XFS may store the filesystem metadata in a separate B-tree that contains all the inodes. A storage system may store the filesystem metadata separate from the filesystem data.

The one or more storage locations of filesystem metadata in a data source to be backed up may be identified. Instead of traversing the filesystem tree structure to identify a location of the filesystem metadata, the filesystem metadata may be directly read from the one or more identified storage locations of filesystem metadata in the data source. For example, in some embodiments, the filesystem metadata is stored in a contiguous range. A single read command may be issued to obtain all of the filesystem metadata associated with the system. In other embodiments, multiple read commands may be issued to obtain all of the filesystem metadata associated with the system because the filesystem metadata is stored in disjointed ranges. The filesystem in the disk file may be parsed to identify the range(s) in the disk file corresponding to the filesystem metadata, which may or may not be disjoint ranges.

Each range (continuous or disjointed) may be divided into a plurality of smaller portions (e.g., 1 MB). A plurality of concurrent read requests for the plurality of smaller portions may be issued. Operating System level prefetch operations may aid this process since contiguous chunks of data are likely to be read. In some embodiments, the data associated with an inode may spill over, and span two or more different locations in the disk file. In such a scenario, the data associated with the inode is fetched from the disk location for the inode and the disk location(s) for the spill over data even though an additional seek request has to be performed. However, such an approach is still more efficient than traversing the entire filesystem tree because a smaller number of seek/read requests is required.

The filesystem metadata information may be extracted from the one or more identified storage locations. The filesystem metadata information stored in the inodes may be read to extract the filesystem metadata information. Such filesystem metadata information may include name, size, modified time, parent inode, etc. For a particular inode, the parent inode information may indicate another inode that includes a reference to the particular inode.

The extracted filesystem metadata information may be copied and stored in a data structure. For example, the data structure may be a key-value store such as a disk-backed key-value store. The key-value store may store the extracted filesystem metadata information as a key-value pair (KVP). The inode identifier (ID) may be used as the key and the metadata associated with the inode ID may be stored as the value. The data structure may be stored in a storage tier of a storage system. In some embodiments, the storage system is comprised of a single storage tier and the extracted filesystem metadata information is stored in the single storage tier. In some embodiments, the storage system is comprised of a plurality of storage tiers. The data structure comprising the extracted filesystem metadata information may be stored in a first tier of storage (e.g., a storage tier with faster performance than one or more other storage tiers that may be available to the system). Because the amount of data of the extracted filesystem metadata information is much smaller when compared to the amount of data of the original disk file, it may be effective to store the extracted metadata information in a first storage tier. A storage included in the first tier of storage may be referred to as "fast storage." Storing data in a first tier of storage may be expensive because the amount of storage is finite and smaller than a one or more other tiers of storage (e.g., hard disk drive (HDD)), but the time savings associated with faster reads of the filesystem metadata is worth the expense. Separate key-value stores may be generated for directories and files. In some embodiments, the data structure comprising the extracted filesystem metadata information is stored in a second tier of storage (e.g., a storage tier with slower performance than the first tier of storage). In some embodiments, a least recently used (LRU) cache of the inode ID to the directory name may be constructed while the filesystem metadata information is being copied to the first tier of storage. The LRU cache may be used to reconstruct the key-value store in the event of a crash.

The contents of the data structure may be analyzed to index a relationship structure between the inodes of the filesystem. The one or more key value stores (e.g., one or more directory key-value stores, one or more file key-value stores) may be scanned to construct the complete path using the directory name cache. In some embodiments, because the data structure is stored in a first tier of storage, such as a SSD, the amount of time needed to generate the index is less than if the index was generated by traversing the filesystem tree structure and using the lower performance tier of the source system, such as disk, to retrieve the inode information. This may allow large sequential reads to be performed, which is faster than spinning up the disk each time data associated with an inode is to be read. In some embodiments, the data structure is stored in a non-first tier of storage and the amount of time needed to generate the index may still be less than if the index was generated by traversing the filesystem tree structure and using the lower performance tier of the source system, such as disk, to retrieve the inode information because the non-first tier of storage allows large sequential reads to be performed, which is faster than spinning up the disk each time data associated with an inode is to be read. Regardless of whether the data structure comprising the extracted filesystem metadata information is stored in a first tier of storage or non-first tier of storage, the amount of time needed to generate the index is less than the amount of time needed to generate the index by traversing the filesystem tree structure.

The relationship structure may be generated based in part on the parent inode information included in the extracted filesystem metadata information. For example, a leaf inode may include a reference (e.g., a "reverse pointer") to an intermediate node. An intermediate inode may include a reverse pointer to a second intermediate inode or a directory inode. The generated relationship structure may indicate that the intermediate node includes a reference to the leaf inode and that the directory inode or the second intermediate inode includes a reference to the intermediate inode. The relationship structure of the filesystem tree structure may be generated based on the corresponding reverse pointers associated with the inodes.

As a result, the filesystem tree structure has been indexed without having to load the disks. A filesystem tree structure may be comprised of hundreds or thousands of inodes. The amount of time and resources needed to index the filesystem tree structure using the techniques disclosed herein may be reduced.

FIG. 1 is a diagram illustrating an example of a filesystem tree. In the example shown, filesystem tree 100 includes a plurality of inodes. An inode is a data structure that describes a file system object and may correspond to a file, a directory, or a sub-directory. An inode may store a pointer to another node. An inode may store a reverse pointer (e.g., the inode ID of a second inode that includes a pointer to the inode). In the example shown, filesystem tree 100 includes root inode 102, intermediate inodes 104, 106, 108, 114, 116, and leaf inodes 118, 120, 110, 112, 122, 124, 126.

Systems may construct an index of filesystem tree 100 by starting at root inode 102 and traversing filesystem tree 100 to each of the inodes. The systems may have used a DFS traversal to extract all files along with their full paths.

However, a DFS traversal of filesystem tree 100 is slow and inefficient. Prefetching of blocks from disks may result in large read amplification. Blocks of data are generally read from disk in large chunks. For example, 10 GB of data may be access and extract metadata that was spread over 1 GB of disk area. Excessive CPU and latency may be encountered due to many layers and too many calls. A filesystem read may read small areas from the underlying disk image. Small reads are inefficient because they cause the spindle heads to move many times. Fragmentation of the underlying filesystem may lead to a large number of random reads, which may lead to poor indexing performance.

Advantageously, the relationship structure of filesystem tree 100 may be indexed without having to perform a DFS traversal of filesystem 100. The relationship structure of filesystem 100 may be indexed by identifying one or more storage locations of filesystem metadata in a data source to be backed up, extracting filesystem metadata from the one or more identified storage locations, copying and storing the extracted filesystem metadata in a data structure that is stored in a first tier of storage, and analyzing the contents of the data structure stored in the first tier of storage to generate an index of filesystem tree 100. This may reduce the amount of time and resources needed to index filesystem tree structure 100

Figure 2:
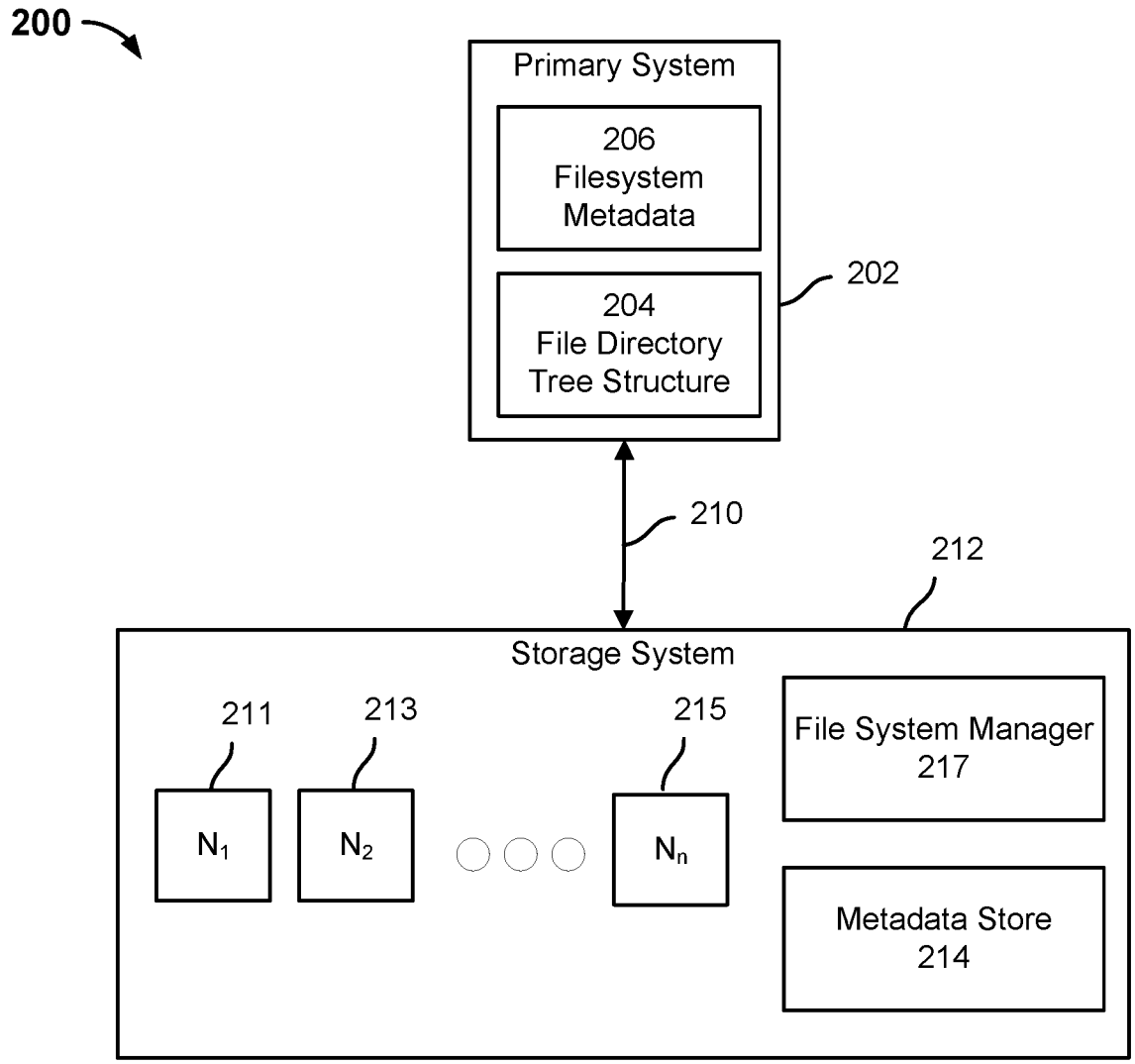
FIG. 2 is a block diagram illustrating an embodiment of a system for indexing a filesystem tree.

FIG. 2 is a block diagram illustrating an embodiment of a system for indexing a filesystem tree. In the example shown, system 200 includes primary system 202 and storage system 212.

Primary system 202 is a computing system that is configured to store a plurality of files. Primary system 202 may be comprised of one or more servers, one or more computing devices, one or more storage devices, and/or a combination thereof. Primary system 202 may be configured to organize the plurality of files using file directory tree structure 204. File directory tree structure 204 may be comprised of a root node, one or more levels of one or more intermediate nodes, and a plurality of leaf nodes. A node of file directory tree structure 204 may correspond to a directory, a sub-directory, or a file.

Each node of the file directory tree structure 204 may have a corresponding inode. The filesystem may be represented as a filesystem tree structure comprised of a plurality of inodes. An inode is a data structure that describes a file system object, such as a file, directory, or sub-directory. The plurality of inodes correspond to filesystem metadata 206 and may be stored in one or more storage locations of primary system 202. For example, filesystem metadata 206 may be stored in one or more hard disks (not shown) of primary system 202.

An inode may store a pointer to another inode. A file system object may be assigned a name and an inode number when the file system object is generated. A filesystem may store a data structure that associates the file system object name with the inode number. When a file with a particular filename is requested, the filename may be used to identify the inode associated with the file. The inodes may be used to locate the data associated with the file. For example, the inode tree structure may be traversed to the inode associated with the file to locate the data associated with the file. The pointers stored by the inodes may be used to locate the inode associated with the file. The data associated with each inode included in the traversal path may be fetched and read. Each fetch and read step has an associated cost (e.g., spinning up disk, computing resources, time to perform the fetch and read step, etc.).

Storage system 212 may be comprised of a plurality of storage nodes 211, 213, 215. Storage system 212 may access primary system 202 via connection 210. Connection 210 may be a wired or wireless connection. Connection 210 may be a LAN, WAN, intranet, the Internet, or a combination thereof. In some embodiments, storage system 212 accesses primary system 202 using a distributed file system protocol (e.g., network file system) to remotely access filesystem metadata 206. Storage system 212 may ingest and store data received from primary system 202 via connection 210. Each storage node of storage system 212 may have its own corresponding processor. Storage system 212 may be comprised of one or more storage tiers. Storage nodes 211, 213, 215 may be comprised of storage included in each of the one or more storage tiers. For example, a storage node may include one or more SSDs, one or more HDDs, or a combination thereof. A first storage tier may be comprised of one or more SSDs and a second storage tier may be comprised of one or more HDDs. The data received from primary system 202 may be stored in one or more of the storage nodes 211, 213, 215. In some embodiments, the one or more storage nodes store one or more copies of the data. In one embodiment, storage system 212 is comprised of one SSD and three HDDs. The data received from primary system 202 may be stored at a first storage tier (e.g., one or more SSDs) and/or a second storage tier (e.g., one or more HDDs).

In some embodiments, the data received from primary system 202 includes file system data that is included in a backup snapshot. A backup snapshot represents a state of the file system data of primary system 202 at a particular moment in time. In some embodiments, the backup snapshot is a full backup snapshot and includes all of the file system data stored on primary system 202 at the time at which the backup snapshot is performed. In other embodiments, the backup snapshot is an incremental backup snapshot and includes the file system data stored on primary system 202 that was not previously backed up.

A storage node of storage system 212 may include a processor that is configured to run file system manager 217. In other embodiments, the processors of a plurality of storage nodes of storage system 212 are configured to run file system manager 217. File system manager 217 may be configured to organize in a tree data structure the file system data received in a backup snapshot from primary system 202. An example of the tree data structure is a file system metadata snapshot tree (e.g., Cohesity Snaptree®)), which may be based on a B+ tree structure (or other type of tree structure in other embodiments). The tree data structure provides a view of the file system data corresponding to a backup snapshot. The view of the file system data corresponding to the backup snapshot may be comprised of a file system metadata snapshot tree and a plurality of file metadata structures (also referred to as a "file metadata tree"). A file metadata structure may correspond to one of the files included in the backup snapshot. The file metadata structure is a snapshot structure that stores the metadata associated with the file. The file system metadata snapshot tree and file metadata structures may be stored in metadata store 214. Metadata store 214 may store a view of file system data corresponding to a backup snapshot. Metadata store 214 may also store data associated with content files that are smaller than a limit size (e.g., 256 kB). Metadata store 214 may be stored at a first storage tier across the storage nodes 211, 213, 215.

The tree data structure may be used to capture different versions of backup snapshots. The tree data structure allows a chain of file system metadata snapshot trees corresponding to different versions of backup snapshots (i.e., different file system metadata snapshot tree versions) to be linked together by allowing a node of a later version of a file system metadata snapshot tree to reference a node of a previous version of a file system metadata snapshot tree (e.g., a "snapshot tree forest"). For example, a root node or an intermediate node of a second file system metadata snapshot tree corresponding to a second backup snapshot may reference an intermediate node or leaf node of a first file system metadata snapshot tree corresponding to a first backup snapshot.

A file system metadata snapshot tree is a representation of a fully hydrated backup because it provides a complete view of the storage volume(s) of primary system 202 at a particular moment in time. A fully hydrated backup is a backup that is ready for use without having to reconstruct a plurality of backups to use it. Other systems may reconstruct a backup by starting with a full backup and applying one or more changes associated with one or more incremental backups to the data associated with the full backup. In contrast, any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. For example, a root node associated with the file system metadata snapshot tree may include one or more references to leaf nodes associated with one or more previous backup snapshots and one or more references to leaf nodes associated with the current backup snapshot. This may provide significant savings in the amount of time needed to restore or recover a storage volume and/or a database. In contrast, other recovery/restoration methods may require significant time, storage, and computational resources to reconstruct a particular version of a volume or database from a full backup and a series of incremental backups.

A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a file metadata structure (e.g., Blob structure), or a pointer to a data chunk stored on the storage system.

Data associated with a file that is smaller than or equal to a limit size (e.g., 256 kB) may be stored in a leaf node of the file system metadata snapshot tree. A leaf node may be an index node (inode). A file metadata structure may be generated for a file that is larger than the limit size. The file metadata structure is a snapshot structure and is configured to store the metadata associated with a version of a file.

The file metadata structure may include a root node, one or more levels of one or more intermediate nodes associated with the root node, and one or more leaf nodes associated with an intermediate node of the lowest intermediate level. The tree data structure associated with a file metadata structure allows a chain of file metadata structures corresponding to different versions of a file to be linked together by allowing a node of a later version of a file metadata structure to reference a node of a previous version of a file metadata structure. For example, a root node or an intermediate node of a second file metadata structure corresponding to a second version of a file may reference an intermediate node or leaf node of a first file metadata structure corresponding to a first version of the file. A file metadata structure may be associated with a plurality of chunk files. A chunk file may be comprised of a plurality of file segment data chunks.

A leaf node of a file metadata structure may store a value, such as an identifier of a data brick associated with one or more data chunks. For example, a file metadata structure may correspond to a file and a leaf node of the file metadata structure may include a pointer to or an identifier of a data brick associated with one or more data chunks of the file. A data brick may be associated with one or more data chunks. In some embodiments, the size of a brick is 256 kB. The one or more data chunks may be of variable length within a particular range (e.g., 4 kB to 64 kB).

The location of the one or more data chunks associated with a data brick may be identified using one or more data structures (e.g., list, table, etc.) stored in metadata store 214. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Storage system 212 may store the data associated with a plurality of files separately from the metadata associated with the plurality of files. The portion of storage in storage system 212 that corresponds to the metadata associated with the plurality of files may be analyzed to determine which files correspond to different portions of the metadata associated with the plurality of files. Storage system 212 may manage a map that associates each file with a respective file offset range of metadata associated with the plurality of files. For example, a first offset range of metadata may be associated with a first file, a second offset range of metadata may be associated with a second file, . . . , an nth offset range of metadata may be associated with an nth file. The metadata associated with the plurality of files may be read. The metadata associated with a particular file may store a timestamp that indicates the file associated with the metadata has changed, i.e., the file has been modified. For example, the metadata associated with a file may store a timestamp that indicates the file was modified after a previous backup snapshot but before a current backup snapshot. File manager 217 may read the metadata associated with the plurality of files. For metadata that indicates a file has changed since a last backup snapshot, file manager 217 may use the map to determine the file that corresponds to the file offset range of metadata. An index of files may be generated to indicate that a version of the file is associated with the current backup snapshot, i.e., the modified version of the file is associated with the current backup snapshot.

In some embodiments, one or more files that have changed after a previous backup snapshot and before a current backup snapshot received from primary system 202 are identified.

The changed files may be identified by reading the metadata associated with the plurality of files. Portions of the metadata associated with the plurality of files may have been added since the previous backup snapshot. These portions may have a particular offset range. The metadata associated with the plurality of files having the particular offset range may be read to identify the one or more files that have changed since the previous backup. The one or more files may be identified as a changed file based on a modification timestamp associated with a file. Storage system 212 may determine a file to have been modified in the event the metadata associated with a file has a modification timestamp that is after a timestamp associated with a previous backup snapshot and before the timestamp associated with the current backup snapshot.

The changed files may be identified by traversing the file system metadata snapshot tree. The file system metadata snapshot tree may include a root node having an identifier that indicates the root node is associated with the current backup snapshot. The file system metadata snapshot tree may be traversed to a leaf node. The leaf node may include the identifier that indicates the leaf node is associated with the current backup snapshot. The leaf node may be an inode. The inode may store an inode ID that is used to determine the file system object corresponding to the inode ID (e.g., directory, sub-directory, file). The portion of the metadata associated with a plurality of files corresponding to the inode ID may be read and the file corresponding to the inode may be determined to be associated with the current backup snapshot. An index of files may be generated to indicate that a version of the file is associated with the current backup snapshot.

In other embodiments, storage system 212 may request primary system 202 to identify one or more files that have been added, modified, or deleted since a previous backup snapshot and before a current backup snapshot. In response to the request, primary system 202 may provide to storage system 212 a list of one or more files that have been added, modified, or deleted since a previous backup snapshot and before a current backup snapshot.

In some embodiments, the data received from primary system 202 includes filesystem metadata. File manager 217 may be configured to remotely access filesystem metadata 206 using a distributed file system protocol (e.g., network file system). Some filesystems, such as the filesystem of primary system 202, may identify the data ranges in the disk file which correspond entirely to filesystem metadata 206 (i.e., the inodes associated with file system objects). For example, a system that uses NTFS may store the filesystem metadata in a separate MFT file. A system that uses XFS may store the filesystem metadata in a separate B-tree that contains all the inodes.

File manager 217 may identify the one or more storage locations of filesystem metadata 206 in primary system 202. Instead of traversing the filesystem tree structure of primary system 202 to identify the one or more storage locations of the filesystem metadata, file manager 217 may directly read filesystem metadata 206 from the one or more identified storage locations. For example, in some embodiments, filesystem metadata 206 is stored in a contiguous range. A single read command may be issued to obtain all of filesystem metadata 206. In other embodiments, file manager 217 may issue a small number of read commands to obtain all of filesystem metadata 206 because the filesystem metadata is stored in disjointed ranges. File manager 217 may parse the filesystem in the disk file of primary system 202 to identify the disjointed ranges in the disk file corresponding to filesystem metadata 206.

Each range (contiguous or disjointed) may be divided into a plurality of smaller portions (e.g., 1 MB). In response to a request for file system metadata 206, primary system 202 may issue a plurality of concurrent read requests for the plurality of smaller portions. The prefetching of the primary system's operating system may aid this process since contiguous chunks of data are being read. In some embodiments, filesystem metadata 206 (e.g., data associated with an inode) may spill over to another location in the disk file. In such a scenario, primary system 202 may fetch from the disk location for the inode and from the disk location for the spill over data, the data associated with the inode even though an additional seek request has to be performed. However, such an approach is still more efficient than traversing the filesystem tree structure to obtain filesystem metadata 206 because a smaller number of read requests/seeks is required.

File manager 217 may extract the filesystem metadata information from the one or more identified storage locations. The filesystem metadata information stored in the inodes may be read to extract the filesystem metadata information. Such filesystem metadata information may include name, size, modified time, parent inode, etc. For a particular inode, the parent inode information may indicate another inode that includes a reference to the particular inode.

File manager 217 may copy the extracted filesystem metadata information and store the extracted filesystem metadata information in a data structure. For example, the data structure may be a disk-backed key-value store. The key-value store may store the extracted filesystem metadata information as a KVP. File manager 217 may store the key-value store across the one or more storage nodes 211, 213, 215. The key-value store may have a corresponding entry for each inode. The inode ID may be used as the key and the metadata information associated with the inode ID may be stored as the value. The data structure may be stored in a storage tier of storage system 212. In some embodiments, storage system 212 is comprised of a single storage tier and the extracted filesystem metadata information is stored in the single storage tier. In some embodiments, storage system 212 is comprised of a plurality of storage tiers. The data structure comprising the extracted filesystem metadata information may be stored in a first tier of storage, such as a SSD. Because the amount of data of the extracted filesystem metadata information is much smaller when compared to the amount of data of the original disk file, it may be effective to store the extracted metadata information in a first storage tier. Storing data in a tier of storage is expensive because the amount of storage is finite and smaller when compared to a one or more other storage tier of storage, such as a HDD, but the time savings associated with faster reads of the filesystem metadata is worth the expense. Separate key-value stores may be generated for directories and files and stored in metadata store 214. In some embodiments, the data structure comprising the extracted filesystem metadata information is stored in a second tier of storage (e.g., a storage tier with slower performance than the first tier of storage). In some embodiments, a LRU cache of the inode ID to the directory name may be constructed while the filesystem metadata information is being copied to the first tier of storage. The LRU cache may be used to reconstruct the key-value store in the event of a crash.

File manager 217 may analyze the contents of the data structure to index a relationship structure of the filesystem of primary system 202. File manager 217 may scan the one or more key value stores (e.g., the one or more directory key-value stores, the one or more file key-value stores) stored in metadata store 214 to construct the complete path using the directory name cache. In some embodiments, because the data structure is stored in a first tier of storage, such as a SSD, the amount of time needed to generate the index is less than if the index was generated by traversing the filesystem tree structure and using the lower performance tier of the source system, such as disk, to retrieve the inode information. This may allow large sequential reads to be performed, which is faster than spinning up the disk each time data associated with an inode is to be read. In some embodiments, the data structure is stored in a non-first tier of storage and the amount of time needed to generate the index may still be less than if the index was generated by traversing the filesystem tree structure and using the lower performance tier of the source system, such as disk, to retrieve the inode information because the non-first tier of storage allows large sequential reads to be performed, which is faster than spinning up the disk each time data associated with an inode is to be read. Regardless of whether the data structure comprising the extracted filesystem metadata information is stored in a first tier of storage or non-first tier of storage, the amount of time needed to generate the index is less than the amount of time needed to generate the index by traversing the filesystem tree structure.

The relationship structure may be generated based in part on the parent inode information included in the extracted filesystem metadata information. For example, a leaf inode may include a reference (e.g., a "reverse pointer") to an intermediate node. An intermediate inode may include a reverse pointer to a second intermediate inode or a directory inode. The generated relationship structure may indicate that the intermediate node includes a reference to the leaf inode and that the directory inode or the second intermediate inode includes a reference to the intermediate inode. The relationship structure of the filesystem tree structure may be generated based on the corresponding reverse pointers associated with the inodes.

Storage system 212 may store the data associated with a plurality of files separately from filesystem metadata 206 received from primary system 202. Storage system 212 may receive multiple versions of filesystem metadata 206 from primary system 202 at different points in time. The portion of storage in storage system 212 that corresponds to filesystem metadata 206 may be analyzed to determine which files correspond to different portions of the metadata associated with the plurality of files. Storage system 212 may manage a map that associates a file offset range of metadata associated with the plurality of files with a corresponding file. The metadata associated with the plurality of files may be read. The metadata associated with a particular file may store a timestamp that indicates the file associated with the metadata has changed, i.e., the file has been modified. For example, the metadata associated with a file may store a timestamp that indicates the file was modified after a previous version of filesystem metadata 206 but before a current version of filesystem metadata 206. For metadata that indicates a file has changed since a previous version, storage system 212 may use the map to determine the file that corresponds to the file offset range of metadata. An index of files may be generated to indicate that a modified version of the file is associated with the current version of filesystem metadata 206.

In some embodiments, storage system 212 may provide secondary storage services, primary storage services, or both. For example, storage system 212 may be part of the secondary storage system for one or more primary systems such as primary system 202. In such embodiments, storage system 212 is configured to back up a plurality of files stored on primary system 202 and generate a corresponding file metadata tree/structure for each of the plurality of files. In some embodiments, storage system 212 is configured to store a plurality of files generated by an entity (e.g., a user, a system or an application) associated with storage system 212 and generate a corresponding file metadata tree/structure for each of the plurality of files. In such embodiments, storage system 212 may provide primary storage services. In some embodiments, storage system 212 may initially be part of a secondary storage system, but be promoted to a role as a primary storage system for some or all resources files) available to storage system 212. Further, although described in the context of a hardware cluster, storage system 212 may be implemented in another manner including but not limited to a virtual cluster in the cloud.

The method and system have been described in the context of a secondary storage system. In some embodiments, such a storage system (e.g., storage system 212) may be primary storage, secondary storage, or both. In some embodiments, secondary storage may be promoted to primary storage. Further, secondary storage may be implemented in a variety of ways, including but not limited to hardware storage and/or a virtual storage in the cloud.

Figure 3:
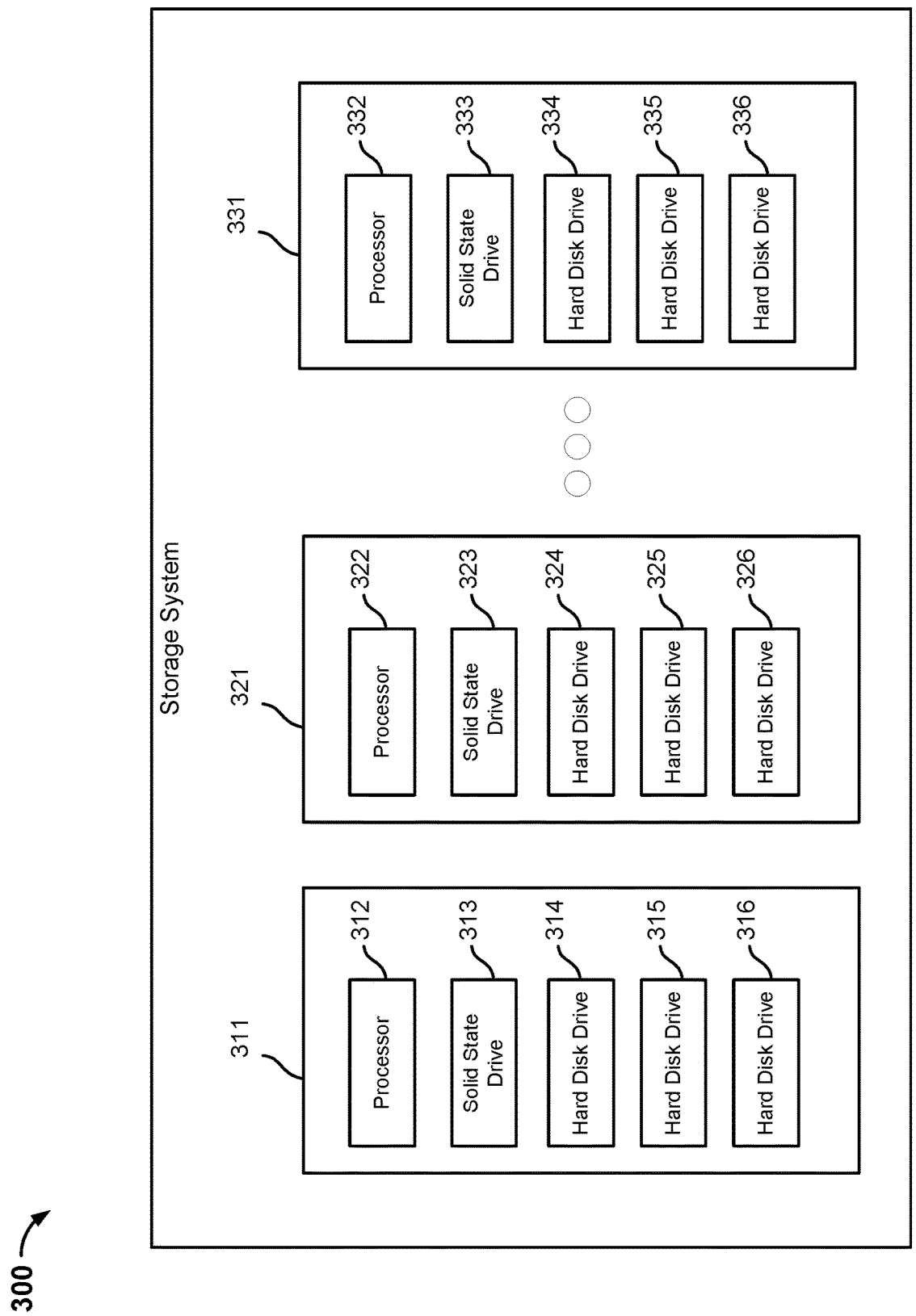
FIG. 3 is a block diagram illustrating an embodiment of a storage system.

FIG. 3 is a block diagram illustrating an embodiment of a storage system. In the example shown, storage system 300 may be implemented as a storage system in a system for indexing a filesystem tree, such as storage system 212.

Storage system 300 is comprised of storage nodes 311, 321, 331. Although three storage nodes are shown, storage system 300 may be comprised of n storage nodes. Each storage node may be comprised of a processor, one or more solid state drives, and one or more hard disk drives. In some embodiments, each storage node is comprised of a processor and a plurality of solid state drives. The plurality of solid state drives may be divided into a plurality of storage tiers based on performance of a solid state drive with respect to the other solid state drives of the system (e.g., first storage tier, second storage tier, third storage tier, etc.).

In the example shown, storage node 311 is comprised of processor 312, solid state drive 313, and hard disk drives 314, 315, 316. Storage node 321 is comprised of processor 322, solid state drive 323, and hard disk drives 324, 325, 326. Storage node 331 is comprised of processor 332, solid state drive 333, and hard disk drives 334, 335, 336. The storage nodes 311, 321, 331 may be comprised of a plurality of storage tiers. Each storage tier may have an associated metric of performance (e.g., amount of time needed to fetch data). For example, a first tier of storage may be comprised of one or more solid state drives. A second tier of storage may be comprised of one or more hard disk drives. In some embodiments, the second tier of storage includes one or more solid state drives with slower performance than the one or more solid state drives included in the first tier of storage.

Storage system 300 may include a metadata store that is stored across storage nodes 311, 321, 331. Storage system 300 may extract filesystem metadata information from a primary system and store the extracted filesystem metadata information in a data structure. For example, the data structure may be a key-value store. The data structure may be stored across the solid state drives 313, 323, 333 of storage system 300. Storing the data structure in a first tier of storage is expensive because the amount of storage is finite and smaller when compared to a second tier of storage, but the time savings associated with faster reads of the filesystem metadata stored in the first tier of storage is worth the expense.

An index of the filesystem may be efficiently generated by analyzing the contents of the data structure stored in a tier of storage which is more efficient than generating the index of a filesystem by mounting the filesystem and then using a plurality of POSIX calls (e.g., ReadDir) to traverse the entire filesystem tree structure and create the filesystem tree structure based on the traversal. By analyzing the contents of the data structure store in the one or more tiers of storage, large sequential reads may be performed and inefficient processes, such as requiring the disk to spin up for each read request associated with many POSIX calls to read the entire filesystem tree structure, may be avoided.

Figure 4:
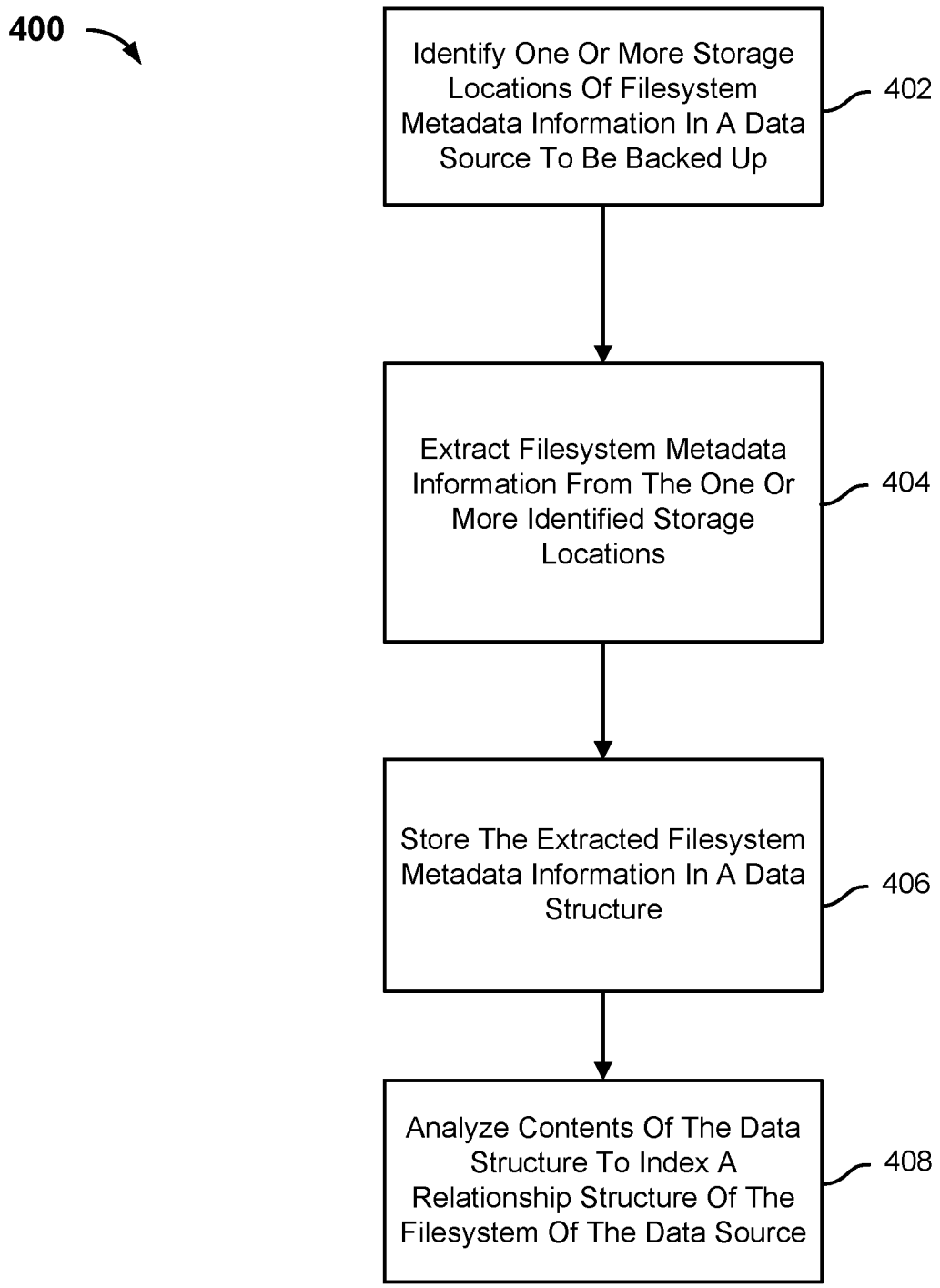
FIG. 4 is a flow chart illustrating an embodiment of a process for indexing a filesystem tree.

FIG. 4 is a flow chart illustrating an embodiment of a process for indexing a filesystem tree. In the example shown, process 400 may be implemented by a storage system, such as storage system 212.

An index for the file directory tree structure may be efficiently generated by leveraging one or more properties associated with particular filesystems. Some filesystems may identity identify the data ranges in the disk file which correspond entirely to the filesystem metadata (i.e., the inodes associated with file system objects). For example, a system that uses NTFS may store the filesystem metadata in a separate MFT file. A system that uses XFS may store the filesystem metadata in a separate B-tree that contains all the inodes. A storage system may store the filesystem metadata separate from the filesystem data.

At 402, one or more storage locations of filesystem metadata information in a data source to be backed up are identified. Instead of traversing the filesystem tree structure to identify a location of the filesystem metadata, the filesystem metadata may be read directly from the one or more identified storage locations of filesystem metadata in the data source. For example, in some embodiments, the filesystem metadata is stored in a contiguous range. A single read command may be issued to obtain all of the filesystem metadata associated with the system. In other embodiments, a few read commands may be issued to obtain all of the filesystem metadata associated with the system because the filesystem metadata is stored in disjointed ranges. The filesystem in the disk file may be parsed to identify the disjointed ranges in the disk file corresponding to the filesystem metadata.

Each range (continuous or disjointed) may be divided into a plurality of smaller portions (e.g., 1 MB). A plurality of concurrent read requests for the plurality of smaller portions may be issued. Any Operating System level prefetching may aid this process since contiguous chunks of data are being read. In some embodiments, the data associated with an inode may spill over to another location in the disk file. In such a scenario, the data associated with the inode is fetched from the disk location for the inode and the disk location for the spill over data even though an additional seek request has to be performed. However, such an approach is still more efficient than traversing the filesystem tree structure to obtain filesystem metadata because a smaller number of read requests/seeks is required.

At 404, filesystem metadata information is extracted from the one or more identified storage locations. The filesystem metadata information stored in the inodes may be read to extract the filesystem metadata information. Such filesystem metadata information may include name, size, modified time, parent inode, etc. For a particular inode, the parent inode information may indicate an inode that includes a reference to the inode.

At 406, the extracted filesystem metadata information is stored in a data structure. The data structure may be a disk-backed key-value store. The key-value store may store the extracted filesystem metadata information as a KVP. The inode ID may be used as the key and the metadata associated with the inode ID may be stored as the value. The data structure may be stored in a storage tier of a storage system. In some embodiments, the storage system is comprised of a single storage tier and the extracted filesystem metadata information is stored in the single storage tier. In some embodiments, the storage system is comprised of a plurality of storage tiers. The data structure comprising the extracted filesystem metadata information may be stored in a first tier of storage (e.g., a storage tier with faster performance than one or more other storage tiers that may be available to the system). Because the amount of data of the extracted filesystem metadata information is much smaller when compared to the amount of data of the original disk file, it may be effective to store the extracted metadata information in a first storage tier. A storage included in the first tier of storage may be referred to as "fast storage." Storing data in a first tier of storage may be expensive because the amount of storage is finite and smaller than a one or more other tiers of storage (e.g., HDD), but the time savings associated with faster reads of the filesystem metadata is worth the expense. Separate key-value stores may be generated for directories and files. In some embodiments, the data structure comprising the extracted filesystem metadata information is stored in a second tier of storage (e.g., a storage tier with slower performance than the first tier of storage). In some embodiments, a LRU cache of the inode ID to the directory name may be constructed while the filesystem metadata information is being copied to the first tier of storage. The LRU cache may be used to reconstruct the key-value store in the event of a crash.

At 408, the contents of the data structure are analyzed to index a relationship structure of the file system contents of the data source. The one or more key value stores (e.g., the directory key-value stores, the file key-value stores) may be scanned to construct the complete path using the directory name cache. In some embodiments, because the data structure is stored in a first tier of storage, such as a SSD, the amount of time needed to generate the index is less than if the index was generated by traversing the filesystem tree structure and using the lower performance tier of the source system, such as disk, to retrieve the inode information. This may allow large sequential reads to be performed, which is faster than spinning up the disk each time data associated with an inode is to be read. In some embodiments, the data structure is stored in a non-first tier of storage and the amount of time needed to generate the index may still be less than if the index was generated by traversing the filesystem tree structure and using the lower performance tier of the source system, such as disk, to retrieve the inode information because the non-first tier of storage allows large sequential reads to be performed, which is faster than spinning up the disk each time data associated with an inode is to be read. Regardless of whether the data structure comprising the extracted filesystem metadata information is stored in a first tier of storage or non-first tier of storage, the amount of time needed to generate the index is less than the amount of time needed to generate the index by traversing the filesystem tree structure.

The relationship structure may be generated based in part on the parent inode information included in the extracted filesystem metadata information. For example, a leaf inode may include a reference (e.g., a "reverse pointer") to an intermediate node. An intermediate inode may include a reverse pointer to a second intermediate inode or a directory inode. The generated relationship structure may indicate that the intermediate node includes a reference to the leaf inode and that the directory inode or the second intermediate inode includes a reference to the intermediate inode. The relationship structure of the filesystem tree structure may be generated based on the corresponding reverse pointers associated with the inodes.

Figure 5:
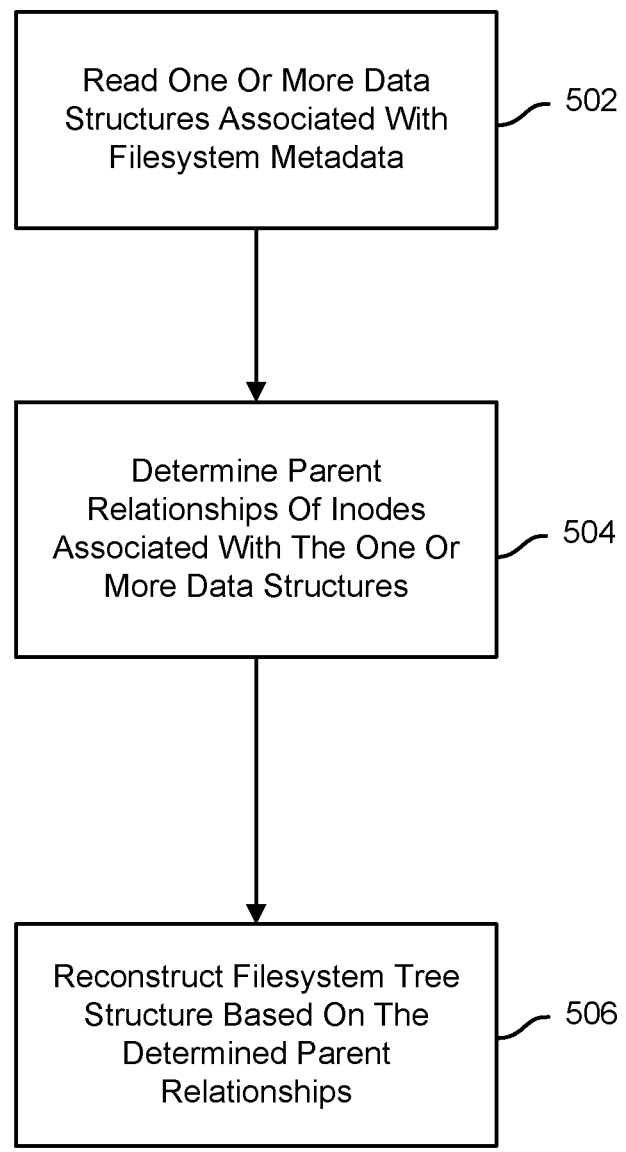
FIG. 5 is a flow chart illustrating an embodiment of a process for reconstructing a relationship structure of a filesystem.

FIG. 5 is a flow chart illustrating an embodiment of a process for reconstructing a relationship structure of a filesystem. In the example shown, process 500 may be implemented by a storage system, such as storage system 212.

At 502, one or more data structures associated with filesystem metadata are read. The data structure may be a disk-backed key-value store. The key-value store may store the extracted filesystem metadata information as a KVP. The inode ID may be used as the key and the metadata associated with the inode ID may be stored as the value. The extracted filesystem metadata information may be stored in a first tier of storage, such as a SSD. Separate key-value stores may be generated for directories and files and stored in the first tier of storage. In some embodiments, a LRU cache of the inode ID to the directory name may be constructed while the filesystem metadata information is being copied to the first tier of storage. The LRU cache may be used to reconstruct the key-value store in the event of a crash.

At 504, parent relationships of inodes associated with the one or more data structures are determined. The value of a KVP may store filesystem metadata information. The filesystem metadata information may include parent inode information, e.g., an indication of an inode that references the inode. The filesystem metadata information included in each entry of the key-value store may be analyzed to determine the parent relationships of the inodes associated with the filesystem tree structure.

At 506, the filesystem tree structure is reconstructed based on the determined parent relationships. The relationship structure may be generated based in part on the parent inode information included in the extracted filesystem metadata information. For example, a leaf inode may include a reference (e.g., a "reverse pointer") to an intermediate node. An intermediate inode may include a reverse pointer to a second intermediate inode or a directory inode. The generated relationship structure may indicate that the intermediate node includes a reference to the leaf inode and that the directory inode or the second intermediate inode includes a reference to the intermediate inode. The relationship structure of the filesystem tree structure may be generated based on the corresponding reverse pointers associated with the inodes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    identifying one or more storage locations associated with a plurality of inodes in a data source to be backed up, wherein the one or more identified storage locations of the plurality of inodes include one or more data ranges in a disk file of the data source which correspond to the plurality of inodes;
    extracting information associated with the plurality of inodes from the one or more identified storage locations of the data source to be backed up to a storage system, wherein at least one item of the extracted information associated with the plurality of inodes includes a reference to a parent inode, wherein extracting the information associated with the plurality of inodes from the one or more identified storage locations of the data source to be backed up to the storage system includes copying the extracted information associated with the plurality of inodes to a first storage tier of the storage system and storing the extracted information associated with the plurality of inodes in one or more data structures that are stored in the first storage tier of the storage system, wherein the one or more data structures include one or more key-value stores; and
    analyzing contents of the one or more data structures to index a relationship structure of the plurality of inodes of the data source, wherein analyzing the contents of the one or more data structures includes:
        scanning the one or more key-value stores; and generating the index of the relationship structure of the plurality of inodes of the data source based on the scanning of the one or more key-value stores.

2. The method of claim 1, wherein identifying the one or more storage locations associated with the plurality of inodes in the data source to be backed up includes issuing a plurality of concurrent read requests for the one or more identified storage locations.

3. The method of claim 1, wherein the storage system is configured to access the data source to be backed up using a distributed file system protocol.

4. The method of claim 1, wherein one of the one or more data structures corresponds to a plurality of files.

5. The method of claim 1, wherein one of the one or more data structures corresponds to a plurality of directories.

6. The method of claim 1, wherein the one or more data structures include a plurality of entries corresponding to the plurality of inodes, each entry associates an inode identifier with metadata information associated with an inode having the inode identifier.

7. The method of claim 6, wherein the metadata information associated with the inode having the inode identifier includes the reference to a corresponding parent inode.

8. The method of claim 1, wherein analyzing the contents of the one or more data structures includes
determining parent relationships of inodes associated with the one or more data structures.

9. The method of claim 8, further comprising reconstructing a filesystem tree structure based on the determined parent relationships.

10. A computer program product, the computer program product being embodied in a non-transitory computer readable storage medium and comprising computer instructions for:
identifying one or more storage locations associated with a plurality of inodes in a data source to be backed up, wherein the one or more identified storage locations of the plurality of inodes include one or more data ranges in a disk file of the data source which correspond to the plurality of inodes;
extracting information associated with the plurality of inodes from the one or more identified storage locations of the data source to be backed up to a storage system, wherein at least one item of the extracted information associated with the plurality of inodes includes a reference to a parent inode, wherein extracting the information associated with the plurality of inodes from the one or more identified storage locations of the data source to be backed up to the storage system includes copying the extracted information associated with the plurality of inodes to a first storage tier of the storage system and storing the extracted information associated with the plurality of inodes in one or more data structures that are stored in the first storage tier of the storage system, wherein the one or more data structures include one or more key-value stores; and
analyzing contents of the one or more data structures to index a relationship structure of the plurality of inodes of the data source, wherein analyzing the contents of the one or more data structures includes:
scanning the one or more key-value stores; and
generating the index of the relationship structure of the plurality of inodes of the data source based on the scanning of the one or more key-value stores.

11. The computer program product of claim 10, wherein to identify the one or more storage locations associated with the plurality of inodes in the data source to be backed up includes issuing a plurality of concurrent read requests for the one or more identified storage locations.

12. The computer program product of claim 10, wherein the first storage tier of the storage system is comprised of one or more solid state drives.

13. The computer program product of claim 11, wherein the storage system is configured to access the data source to be backed up using a distributed file system protocol.

14. The computer program product of claim 10, wherein the one or more data structures include a plurality of entries corresponding to the plurality of inodes, each entry associated an inode identifier with metadata information associated with an inode having the inode identifier.

15. The computer program product of claim 14, wherein the metadata information associated with the inode having the inode identifier includes the reference to a corresponding parent inode.

16. The computer program product of claim 10, wherein analyzing the contents of the one or more data structures further comprises computer instructions for
determining parent relationships of inodes associated with the one or more data structures; and
reconstructing a filesystem tree structure based on the determined parent relationships.

17. A system, comprising:
a processor configured to:
identify one or more storage locations associated with a plurality of inodes in a data source to be backed up, wherein the one or more identified storage locations of the plurality of inodes include one or more data ranges in a disk file of the data source which correspond to the plurality of inodes;
extract information associated with the plurality of inodes from the one or more identified storage locations of the data source to be backed up to a storage system, wherein at least one item of the extracted information associated with the plurality of inodes includes a reference to a parent inode, wherein to extract the information associated with the plurality of inodes from the one or more identified storage locations of the data source to be backed up to the storage system, the processor is configured to copy the extracted information associated with the plurality of inodes to a first storage tier of the storage system and store the extracted information associated with the plurality of inodes in one or more data structures that are stored in the first storage tier of the storage system, wherein the one or more data structures include one or more key-value stores; and
analyze contents of the one or more data structures to index a relationship structure of the plurality of inodes of the data source, wherein to analyze the contents of the one or more data structures, the processor is configured to:
scan the one or more key-value stores; and
generate the index of the relationship structure of the plurality of inodes of the data source based on the scan of the one or more key-value stores; and
a memory coupled to the processor and configured to provide the processor with instructions.

* * * * *